United States Patent
Hyser

(10) Patent No.: US 8,250,373 B2
(45) Date of Patent: Aug. 21, 2012

(54) AUTHENTICATING AND VERIFYING AN AUTHENTICABLE AND VERIFIABLE MODULE

(75) Inventor: Chris D. Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/260,153

(22) Filed: Oct. 29, 2008

(65) Prior Publication Data

US 2009/0055658 A1  Feb. 26, 2009

Related U.S. Application Data

(62) Division of application No. 10/693,378, filed on Oct. 23, 2003, now abandoned.

(51) Int. Cl.
*G06F 21/00* (2006.01)
(52) U.S. Cl. .......................... 713/187; 726/16
(58) Field of Classification Search ........... 713/2
See application file for complete search history.

(56) References Cited

U.S. PATENT DOCUMENTS

| | | | |
|---|---|---|---|
| 5,754,659 A | 5/1998 | Sprunk et al. | |
| 6,185,678 B1 | 2/2001 | Arbaugh et al. | |
| 6,253,324 B1 | 6/2001 | Field et al. | |
| 6,263,431 B1 * | 7/2001 | Lovelace et al. | 713/2 |
| 6,272,631 B1 | 8/2001 | Thomlinson et al. | |
| 6,381,693 B2 | 4/2002 | Fish et al. | |
| 6,401,201 B2 | 6/2002 | Fish et al. | |
| 6,425,081 B1 | 7/2002 | Iwamura | |
| 6,519,762 B1 * | 2/2003 | Colligan et al. | 717/170 |
| 6,948,067 B2 | 9/2005 | Hawkes et al. | |
| 6,959,184 B1 | 10/2005 | Byers et al. | |
| 7,007,159 B2 | 2/2006 | Wyatt | |
| 7,073,059 B2 | 7/2006 | Worely et al. | |
| 2001/0007131 A1 * | 7/2001 | Galasso et al. | 713/187 |
| 2003/0161475 A1 * | 8/2003 | Crumly et al. | 380/280 |

OTHER PUBLICATIONS

Federal Information Processing Standards Publication 180-1, "Secure Hash Standard," pp. 1-18 (Apr. 17, 1995).

* cited by examiner

*Primary Examiner* — Gilberto Barron, Jr.
*Assistant Examiner* — Devin Almeida

(57) ABSTRACT

A module-specific public key and cryptographically protected data related to the module-specific public key are extracted from an authenticable and verifiable module. The cryptographically protected data is compared with the module-specific public key to authenticate the authenticable and verifiable module. A value calculated from an image, including a size and location block, included within the authenticable and verifiable module is compared with a value extracted from a digital signature contained in a verification block within the authenticable and verifiable module to verify the authenticable and verifiable module.

21 Claims, 9 Drawing Sheets

AUTHENTICATING AND VERIFYING AN AUTHENTICABLE AND VERIFIABLE MODULE

CROSS-REFERENCE TO RELATED APPLICATION

This is a divisional of U.S. Ser. No. 10/693,378, entitled "Method and System for Distributed Key Management in a Secure Boot Environment," filed Oct. 23, 2003, now abandoned U.S. Patent Application Publication No. 2005/0091496, which is hereby incorporated by reference.

TECHNICAL FIELD

The present invention relates to secure computer systems.

BACKGROUND

The present invention is related to computer-system security, in particular, to the process by which a secure computing platform is bootstrapped during initialization or restart of a secure computing platform, including secure firmware and optionally including a secure kernel. The techniques of the present invention are, however, potentially applicable to many other secure-computing problems.

FIGS. 1A-C illustrate a secure-computing-platform booting problem described below as an example of the application of one embodiment of the present invention. FIG. 1A shows a number of components of a computer system, including: (1) a processor 102; (2) a read-only memory ("ROM") 104, soldered into the system for security reasons, discussed below, that stores the first instructions/routine 106 executed by the processor following a hard reset or boot; (3) two flash memories 108 and 110 that contain a number of firmware modules 112-117 that are run during system bootstrap, and some of which that are subsequently called as library routines through various interfaces by an operating system; (4) a system bus 120; (5) a bus bridge 122 interconnecting the system bus 120 with a peripherals bus 124; (6) an I/O controller 126 that controls a mass-storage device 128, such as a disk drive; and a system memory 130. As shown in FIG. 1A by arrow 132, following a hard reset or power on, the processor 102 is hardwired to fetch initial instructions, or, equivalently, an initial routine or set of routines 106, from the ROM memory 104. Because a secure system is to be bootstrapped, the initial routine or set of routines needs to be verifiably secure. Thus, the computer-system manufacturer creates the initial routine or routines and verifies their security, and places them on a true ROM that cannot be overwritten and can only be replaced by physically removing the ROM from the computer system. Once the initial routine or routines are executed, the computer system proceeds to successively access and execute firmware modules 112-115 incorporated into one of the flash memories 108, as shown in FIG. 1B. Then, as shown in FIG. 1C, additional firmware modules 116 and 117 in another flash memory 110 are accessed and executed. Eventually, one or intermediate phases are reached, after which an operating system kernel can be loaded from the mass-storage device 128 into memory and the operating system can be securely booted to produce a fully functional, secure computer system.

The bootstrap discussed above with reference to FIGS. 1A-C begins securely, with routines extracted from a true ROM memory, but when the first firmware module in flash memory is accessed, security mechanisms must be in place to validate the security of the firmware module. Flash memories may be rewritten, and can thus be maliciously altered after the computer system has been shipped from the manufacturer. While the ROM can be depended on to be secure, the first routines executed from the ROM must validate the first firmware module accessed, and each firmware module successively accessed must be verified. This verification cannot depend on retrieving information from outside of the computer system, and may not even be able to access information stored on mass-storage devices or on other peripheral devices.

Various techniques have been developed for facilitating a secure boot process, a portion of one example of which is illustrated in FIGS. 1A-C. There are various integrated circuits devoted specifically to security purposes, such as the Trusted Computing Platform Alliance ("TCPA") trusted platform module ("TPM"). Certain modern computer architectures provide simple machine checking of a portion of an initial firmware image. In addition, various rather elegant cryptography-based methodologies have been proposed for general authentication and validation of software executables. However, each of these types of techniques and methodologies for addressing the secure-boot problem have attendant disadvantages and deficiencies. The TCPA TPM chip may require expensive engineering to be incorporated into a secure computing environment. The simple machine checking cannot be performed to validate and authenticate third-party firmware images loaded during a secure boot. Many of the elegant cryptography solutions require storage of cryptographic keys in ways that create vulnerabilities at the hardware level. For these reasons, designers, manufacturers and users of computing systems have recognized the need for a relatively inexpensive, secure, and reliable method for authenticating and validating firmware modules during sequential loading up and building of a secure kernel or monitor via a secure bootstrap process.

SUMMARY OF THE INVENTION

Various embodiments of the present invention provide methods for preparing authenticable and verifiable images of a software modules by adding to received software module images a size and location block, an authentication block including a cryptographically protected module-specific public key and a clear-text version of the module-specific public key, and a verification block that includes a digital signature prepared from the module image. In one particular embodiment of the present invention, a next firmware-module that is to be accessed during a secure boot process is created to include a module-specific public key, a hashed and encrypted version of the module-specific public key, and a digital signature of the firmware-module image prepared using a module-specific private key.

BRIEF DESCRIPTION OF THE DRAWINGS

Some embodiments of the invention are described, by way of example, with respect to the following figures.

DETAILED DESCRIPTION

Figure 1A:
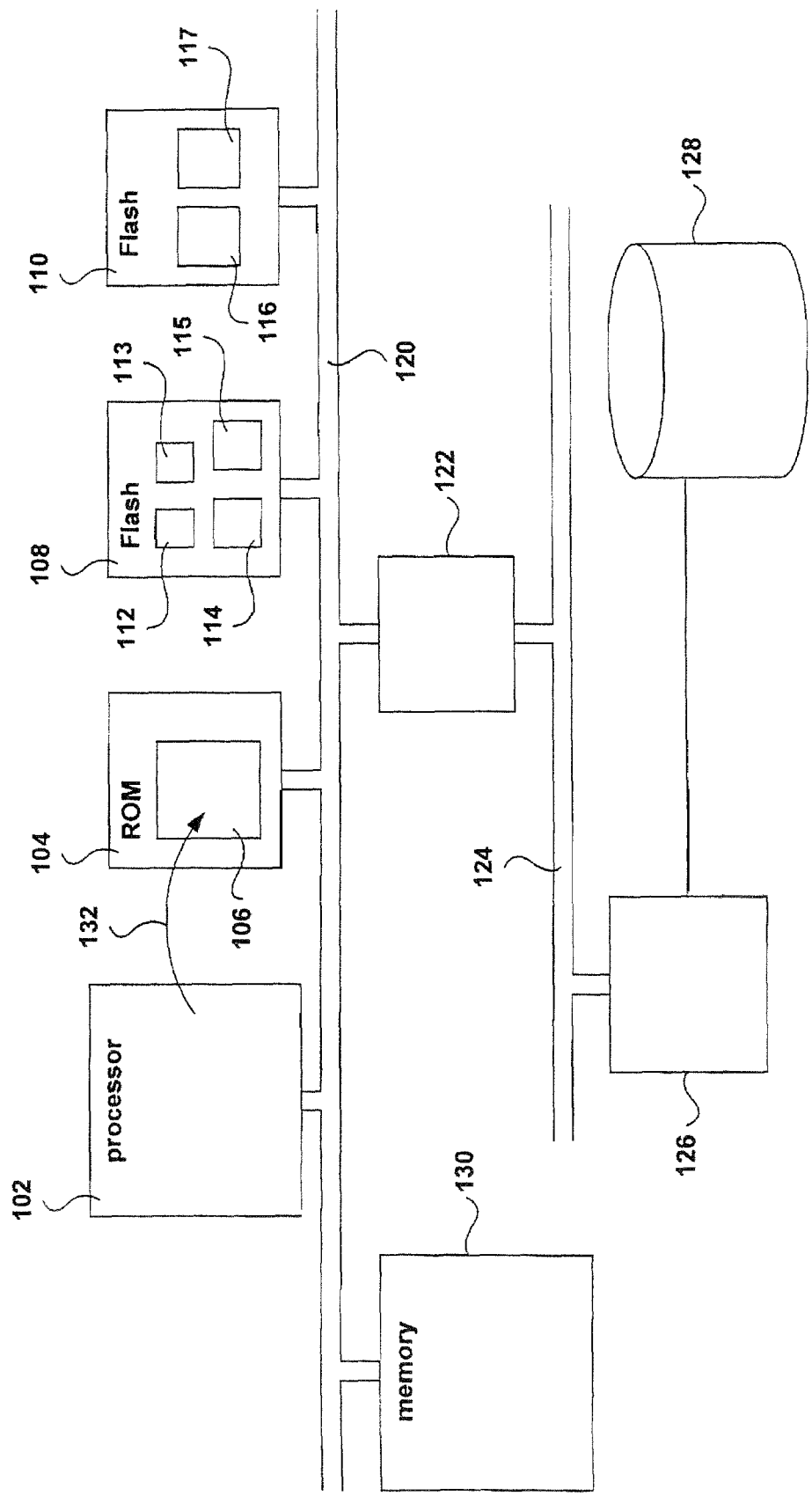
FIGS. 1A-C illustrate a secure-computing-platform booting problem described below as an example of the application of one embodiment of the present invention.

In one particular embodiment of the present invention, a next firmware-module that is to be accessed during a secure boot process is created to include a module-specific public key, a hashed and encrypted version of the module-specific public key, and a digital signature of the firmware-module image prepared using a module-specific private key. A calling firmware module that directs loading of the next firmware module, according to one embodiment of the present invention, employs a calling-module-specific public key to decrypt the hashed and encrypted module-specific public key included in the next firmware module and compare the resulting decrypted, hashed module-specific public key to a hashed, clear-text module-specific public key included in the next firmware module. If the decrypted, hashed module-specific public key is equal to a hashed, clear-text module-specific public key, then, as a second step, the calling firmware module hashes the next-firmware-module image and compares the hashed next-firmware-module image with a hashed next-firmware-module image extracted from the digital signature included within the next firmware-module image using the module-specific public key. If the two hashed firmware-module images match, then the calling firmware module is guaranteed that the next firmware-module is authentic, or, in other words, was produced by the party assumed to have produced the next firmware-module by the calling firmware module, and that the next firmware-module is verified, or, in other words, the next firmware-module has not been modified or corrupted since it was produced.

One embodiment of the present invention relates to a secure bootstrap process that is initiated upon power up or reset of a secure computer system and that leads to sequential access and execution of various firmware modules, and perhaps software modules, leading to an intermediate, secure state in the secure bootstrap process from which an operating system can be launched to produce a fully functional and running secure computing platform. Were all the firmware modules produced by the hardware vendor, and were all the firmware modules able to be stored in read-only memory within the computer hardware, the techniques of the present invention would be of less importance. However, modern secure computing systems are complex combinations of hardware platforms, firmware, and software secure kernels and operating systems that are not produced by a single vendor. Therefore, a flexible, but secure, technique for authenticating and verifying modules during sequential bootstrapping of a secure computing environment are of great importance in the design, manufacture, and use of secure computing systems.

The present invention relies on a combination of several well-known cryptographic methodologies, a summary of which is provided in a following subsection. Following the presentation of these well-known cryptographic methodologies, the present invention is described with reference to a number of block-diagram-like and control-flow-like diagrams.

Cryptography

Figure 2:
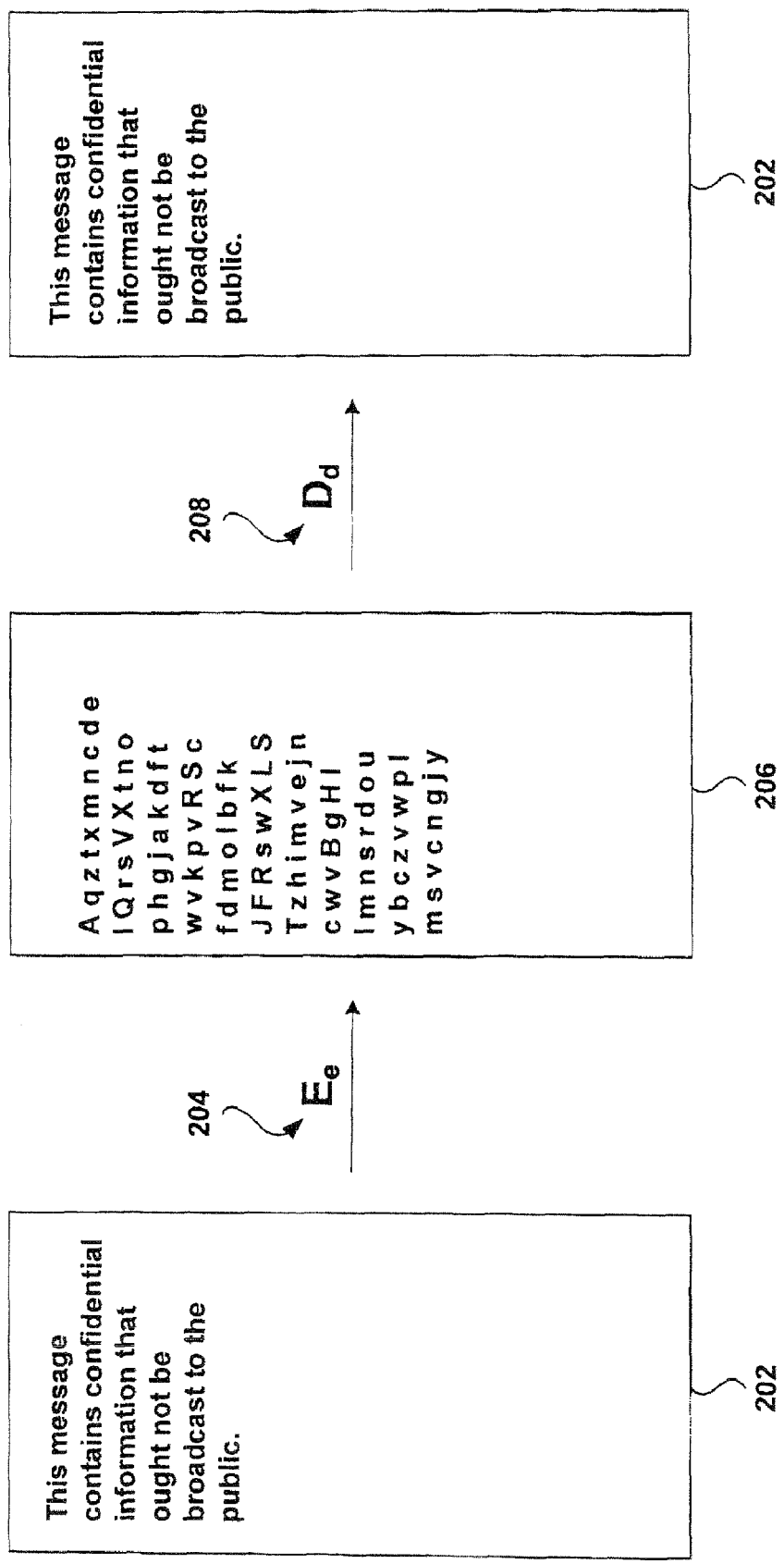
FIG. 2 illustrates a basic principle underlying cryptographic methodologies.

The present invention employs cryptographic methodologies in order to secure communications between an administrative console, or host, and remote agents. In this subsection, the basic cryptographic methods employed are described in general terms. FIG. 2 illustrates a basic principle underlying cryptographic methodologies. Cryptography is designed to transform plain text information into encoded information that cannot be easily decoded by unauthorized entities. For example, FIG. 2 shows a plain text message 202 that includes an English-language sentence. This plain text message can be encrypted by any of various encryption functions E 204 into a corresponding cipher text message 206 that is not readily interpretable. An authorized user is provided with a decryption function D 208 that allows the authorized user to decrypt the cipher text message 206 back to the plain text message 202.

The basic cryptographic methods can be described using the following definitions:

$A_m$ = alphabet for messages = $\{a_{m_1}, a_{m_2}, a_{m_3}, \ldots a_{m_n}\}$ $A_c$ = alphabet for cipher-text = $\{a_{c_1}, a_{c_2}, a_{c_3}, \ldots a_{c_n}\}$ $M$ = message-space = strings of $a_m$ $C$ = cipher-text space = strings of $a_c$ $K$ = key space = $\{e_1, e_2, \ldots e_n\}$ where $E_{e_1}(m) \to c$ = $\{d_1, d_2, \ldots d_n\}$ where $D_{d_1}(d) \to m$ Plain text messages are instances of messages contained within the message space M and cipher text messages are instances of the cipher text messages contained within cipher test space C. A plain text message comprises a string of one or more characters selected from a message alphabet $A_m$, while a cipher-text message comprises a string of one or more characters selected from the cipher-text alphabet $A_c$. Each encryption function E employs a key e and each decryption function D employs a key d, where the keys e and d are selected from a key space K. In a symmetric-key encryption system, the keys e and d are identical, and the secret distribution and maintenance of the symmetric keys in secret provide security. In an asymmetric-key encryption system, the keys e and d are different. The following discussion relates to asymmetric encryption systems.

A key pair is defined as follows:

key pair=$(e,d)$ where $e \in K, d \in K, D_d(E_e(m))=E_e(m)$, and $m \in M$

One key of the key pair, e, is used during encryption to encrypt a message to cipher text via an encryption function E, and the other key of the key pair, d, can be used to regenerate the plain text message from the cipher-text message via a decryption function D.

Public-key cryptographic methods are encryption/decryption techniques employing key pairs (e,d) having the property that, for all key pairs (e,d), no function $f(e)=d$ can be easily determined. Thus, the encryption key e of a public-key pair (e,d) can be freely distributed, because the corresponding decryption key d of the public-key pair cannot be determined from the encryption key e. A well-known example of public-key encryption is the RSA encryption scheme. The RSA scheme employs integer division of large numbers, generated from plain text and cipher-text messages, by large integers n that represent the product of two prime numbers p and q as follows:

$E(m)=m^e \bmod n$ $D(c)=c^d \bmod n$ $ed \bmod (p-1)(q-1)=1$ $n=pq$

Thus, a plain text message is encrypted by considering all of the numeric representations of the characters of the message to be a large number, computing the result of raising the large number to a power equal to the encryption key e, dividing that result by n, and using the remainder of the division as the encrypted message. Decryption employs the same process, raising the cipher-text message to a power equal to the decryption key d, then regenerating the plain text message by considering the remainder, followed by division by n, as a string of numerically represented characters.

A digital signature is a value generated from a message that can be used to authenticate the message. The digital signature space S contains all possible digital signatures for a particular digital signature algorithm applied to messages selected from message space M. Generation of a digital signature involves a secretly held digital signature generation function $S_A$ applied to a message:

$$S_A(m) \rightarrow S$$

The digital signature s is sent, along with the message m from which the digital signature is generated, to a recipient. The recipient employs a public verification function $V_A$ to determine whether the digital signature authenticates the message or, in other words, whether the message was composed by the signer, and has not been modified in the interim. Thus, $V_A$ can be expressed, as follows:

$$V_A(m,s) \rightarrow \{true, false\}$$

where the result true indicates that the message m was composed by the signer who provided the digital signature s.

A digital-signature system can be generated from a reversible public-key encryption system, defined as follows:

$$\text{for all } m, D_d(E_e(m)) = E_e(D_d(m))$$

where the message space, M=the cipher space, C=the digital signature space, S. The digital-signature-generating function $S_A$ can be selected as:

$$S_A = D_d$$

so that:

$$S = D_d(m)$$

The verification function $V_A$ can then be selected as:

$$V_A(m, s) = \begin{cases} true, & \text{if } E_e(s) = m \\ false & \end{cases}$$

Thus, the techniques of the public key encryption technique can be used to generate digital signatures that can, in turn, be used by a digitally signed message recipient, to verify that a message was sent by the party supplying the digital signature. While it is generally feasible to digitally sign entire, short email messages, it is rather inefficient to digitally sign large amounts of data, such as an executable image. A more efficient way to digitally sign a large amount of data, such as an executable image, is to first digitally hash the large amount of data to a hash value, and then digitally sign the hash value. An efficient hashing function is required that produces a relatively small hash value from a large amount of data in a way that generates large distances in hash-value space between hash values generated from data inputs relatively close together in data-input space. In other words, small changes to input data should widely disperse generated hash values in hash-value space, so that the hash function cannot be deduced systematically. One example of a hash function widely used for this purpose is the Secure Hash Algorithm ("SHA-1") specified by the Secure Hash Standard. The SHA-1 secure hash algorithm generates a 160-bit hash value, called a message digest, from a data file of any length less than 264 bits in length. The SHA-1 algorithm is a secure hash because it is computationally infeasible to find a message which corresponds to a given message digest, or to find two different messages which produce the same message digest.

Secure-Boot Embodiment of the Present Invention

Figure 3:
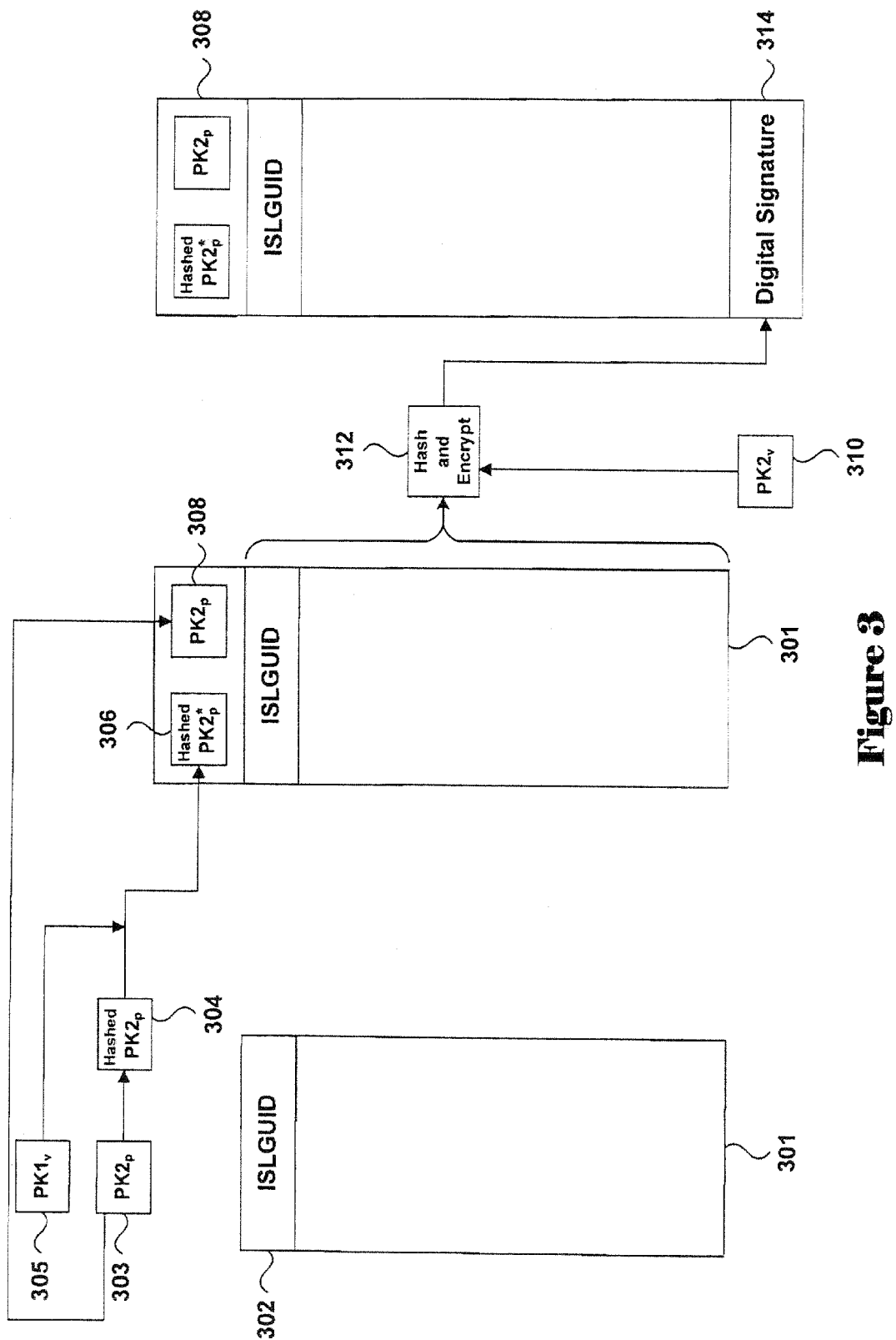
FIG. 3 illustrates preparation of a firmware module compatible with the loading techniques of one embodiment of the present invention.

One embodiment of the present invention provides a method by which a calling firmware module or combination of firmware modules can authenticate and verify a next firmware module that needs to accessed, possibly executed, and incorporated into the processing environment of a secure computing system. FIG. 3 illustrates preparation of a firmware-module image compatible with the authentication and verification techniques of one embodiment of the present invention. FIG. 3 includes both block diagrams and flow-control-like annotations.

The process of constructing the authenticable and verifiable firmware-module image begins with a firmware image 301 that includes an image size, location, and globally unique identifier ("GUID") header ("ISLGUID") 302 that serves to describe the size and location of the firmware image within a flash memory or other non-volatile memory and to identify, via the GUID, the class of machines for which the firmware module has been created. By accessing the ISLGUID header, a calling module accessing firmware-module can determine where to find additional information in order to authenticate and verify the firmware module. Note that the ISLGUID block does not necessarily need to be a header, as shown in FIG. 3, but may be incorporated into the firmware-module image at any specific, commonly known location to allow access by a calling module.

In a next step in the preparation of the authenticable and verifiable firmware-module image, a secure hash function, such as the SHA-1 secure hash function described above, is used to hash a public encryption key ("$PK2_P$") 303 associated with the firmware module to produce a hashed public key, or message digest, 304 corresponding to the public key "$PK2_P$" Next, the firmware-module developer provides the hashed public key "$PK2_P$" to the vendor of the calling firmware module, who uses a private key "$PK1_V$" 305 to encrypt the hashed $PK2_P$ 304 to produce an encrypted, hashed, module-specific public key "$PK2_P*$" 306 that the calling-firmware-module vendor returns to the firmware-module developer. The hashed, encrypted public key "$PK2_P*$" 306 is placed, along with the clear-text version of public key "$PK2_P$" into an authentication header 308 that is prepended to the firmware-module image 301. The private key "$PK1_V$" is a secret key used by the vender or manufacturer of the calling firmware module. In general, the private key "$PK1_V$" will be kept secure by the calling module's manufacturer, never disclosing the private key "$PK1_V$" to any third party. Because the encryption key "$PK2_P$" is a public encryption key associated with the firmware-module image, the public encryption key "$PK2_P$" can be freely furnished by the vendor of the firmware-module image to third parties.

Next, the agreed-upon secure hash algorithm is used to hash the contents of the firmware-module image 301, excluding the prepended authentication header 308, and the resulting message digest is encrypted with a private encryption key "$PK2_V$" 310 corresponding to the public encryption key "$PK2_P$" 303. The hashing and encryption operations are shown in FIG. 3 as step 312. The hashing and encryption of the firmware-module image 301 produces a digital signature which is appended to the firmware-module image as a verification footer 314.

The completed authenticatable and verifiable firmware module thus comprises an authentication header 308 including a hashed and encrypted public key "$PK2^*_P$" and clear-text version of the public key "$PK2_P$," the firmware module 301 including an ISLGUID block 302, and a verification footer that includes a digital signature 314. Note that both the authentication header 308 and verification footer 314 may be alternatively included within the firmware module at specific, commonly known locations, may be both prepended or appended to the firmware module, or may be packaged as discrete entities along with the firmware module. In the discussed embodiment, the authentication block is prepended as a header and the verification block is appended as a footer, as shown in FIG. 3.

Figure 1B:
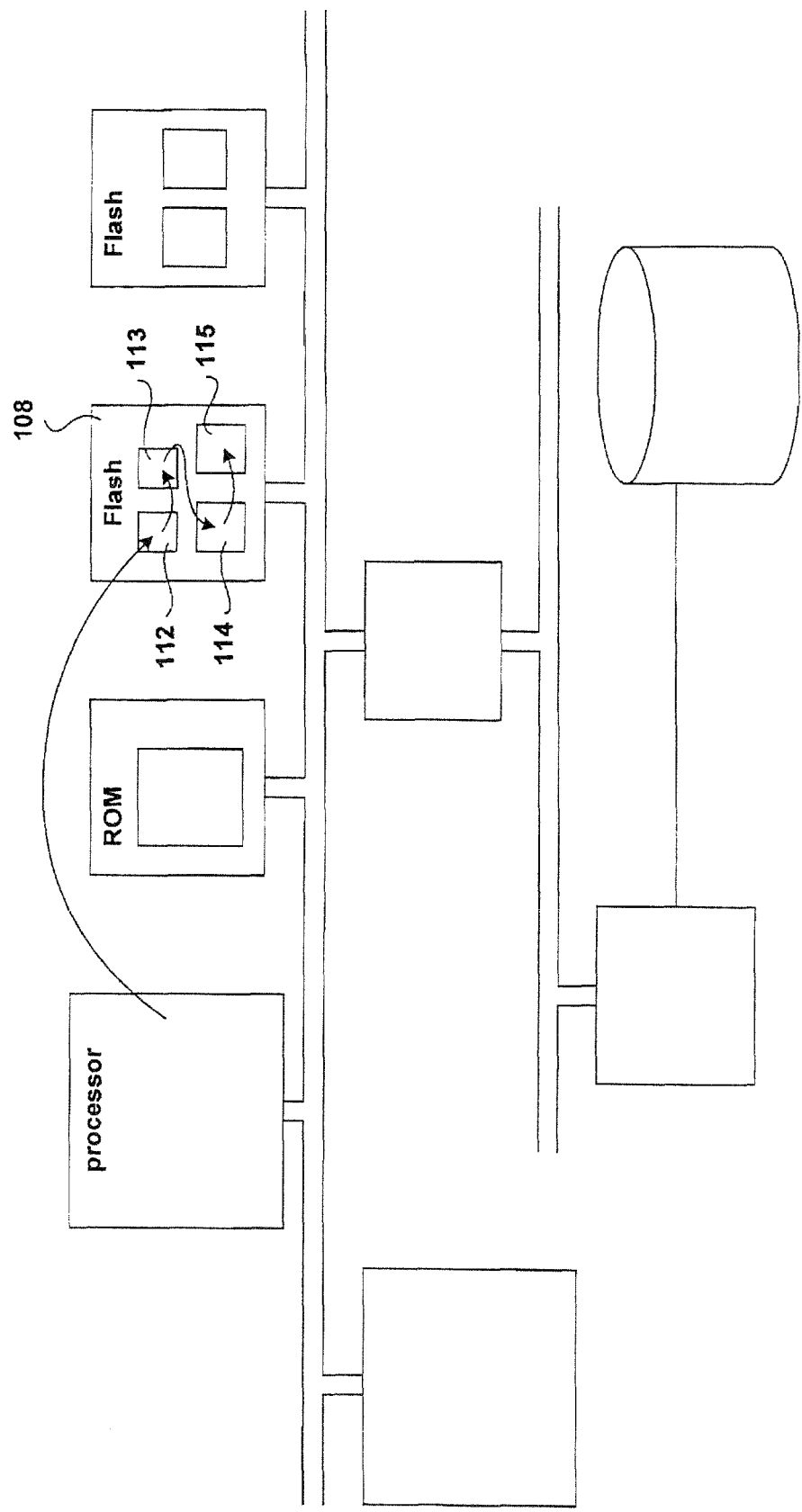
Figure 1C:
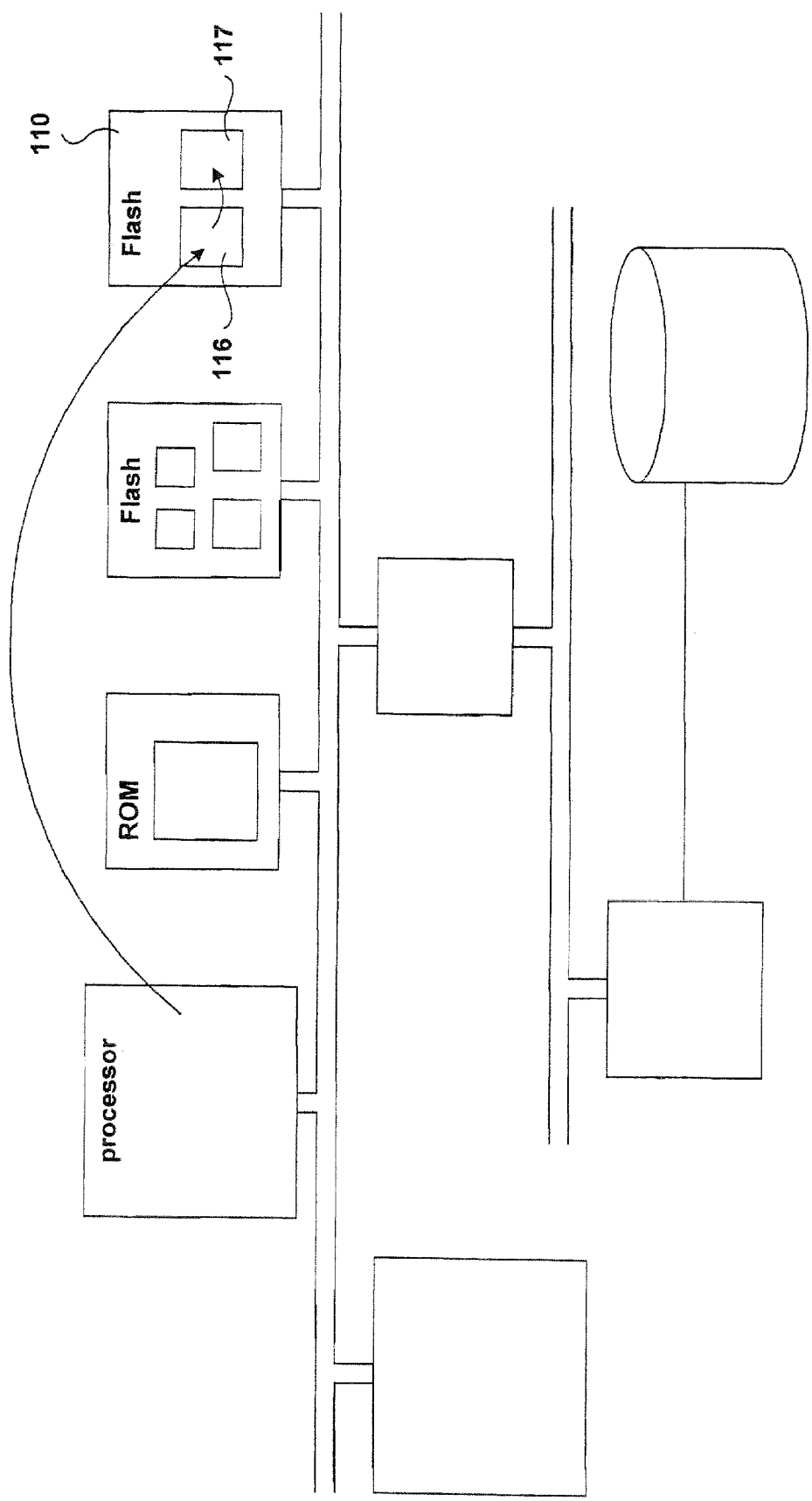
Figure 4:
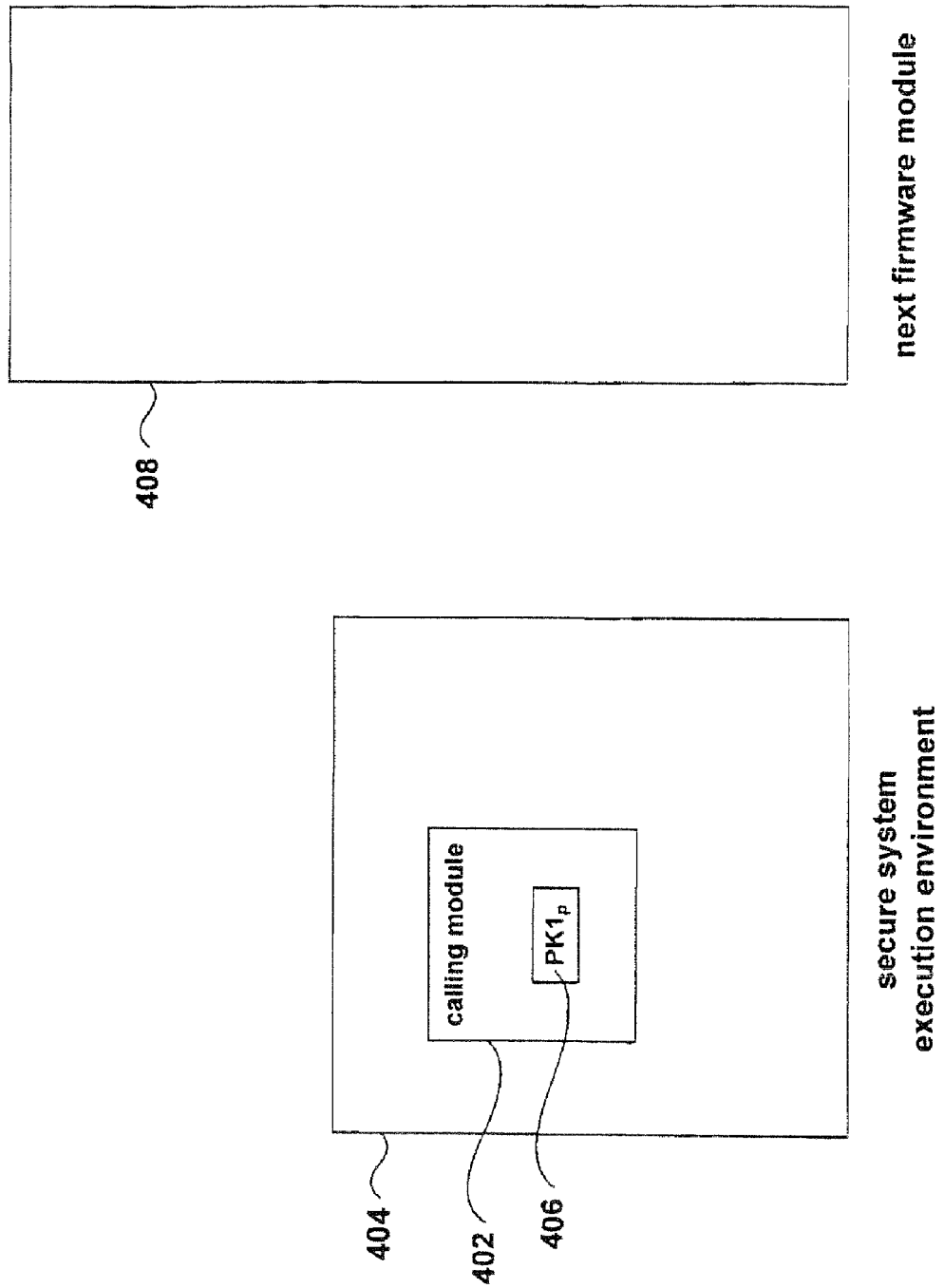
FIGS. 4-7 illustrate the firmware-module-image authentication and verification process used by a calling module to authenticate and verify a firmware module prepared as described with reference to FIG. 3.

FIGS. 4-7 illustrate the firmware-module-image authentication and verification process used by a calling module to authenticate and verify a firmware module prepared as described with reference to FIG. 3. The accessed firmware module is referred to as the "next firmware module" 408. In FIG. 4, the calling firmware module 402 is shown abstractly incorporated within the current execution environment of a secure computer system 404, which includes tangible computer-readable medium such as ROM 104, flash memories 108, 110, or mass-storage device 128 shown in FIGS. 1A-1C. Note that the calling module includes a stored version of the calling module's public encryption key "$PK1_P$" 406.

Figure 5:
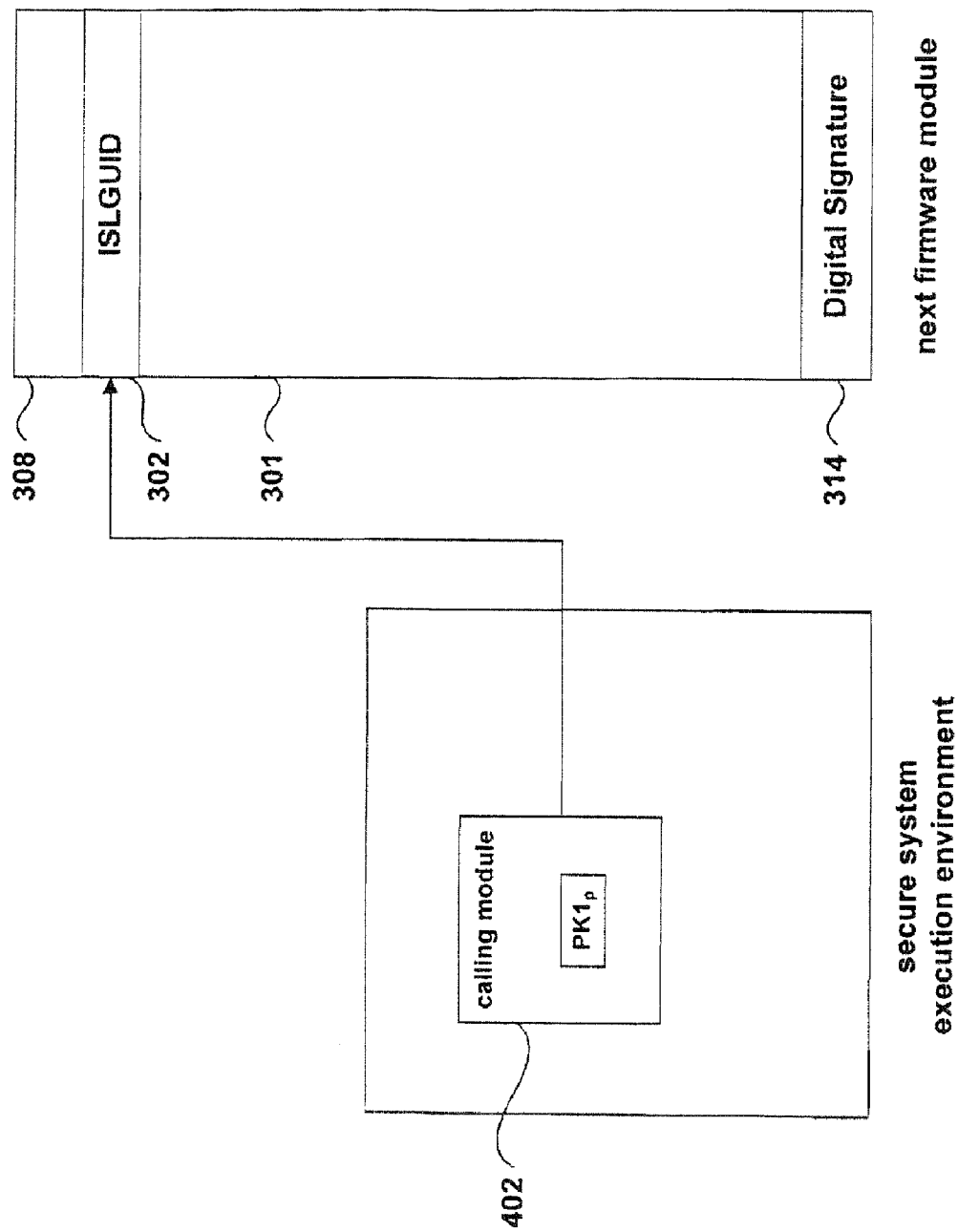

FIG. 5 illustrates the first step of the authentication process that represents a portion of one embodiment of the present invention. In FIG. 5, the calling module 402 accesses the ISLGUID block 302 of the next firmware module. The calling module 402 accesses the ISLGUID block in order to first check the GUID included in the ISLGUID to make sure that the next firmware module is intended for the machine on which it has been loaded, and to then determine the sizes and locations of the relevant portions of the next firmware module, including the authentication header 308, the firmware-module image 301, and the verification footer 314.

Figure 6:
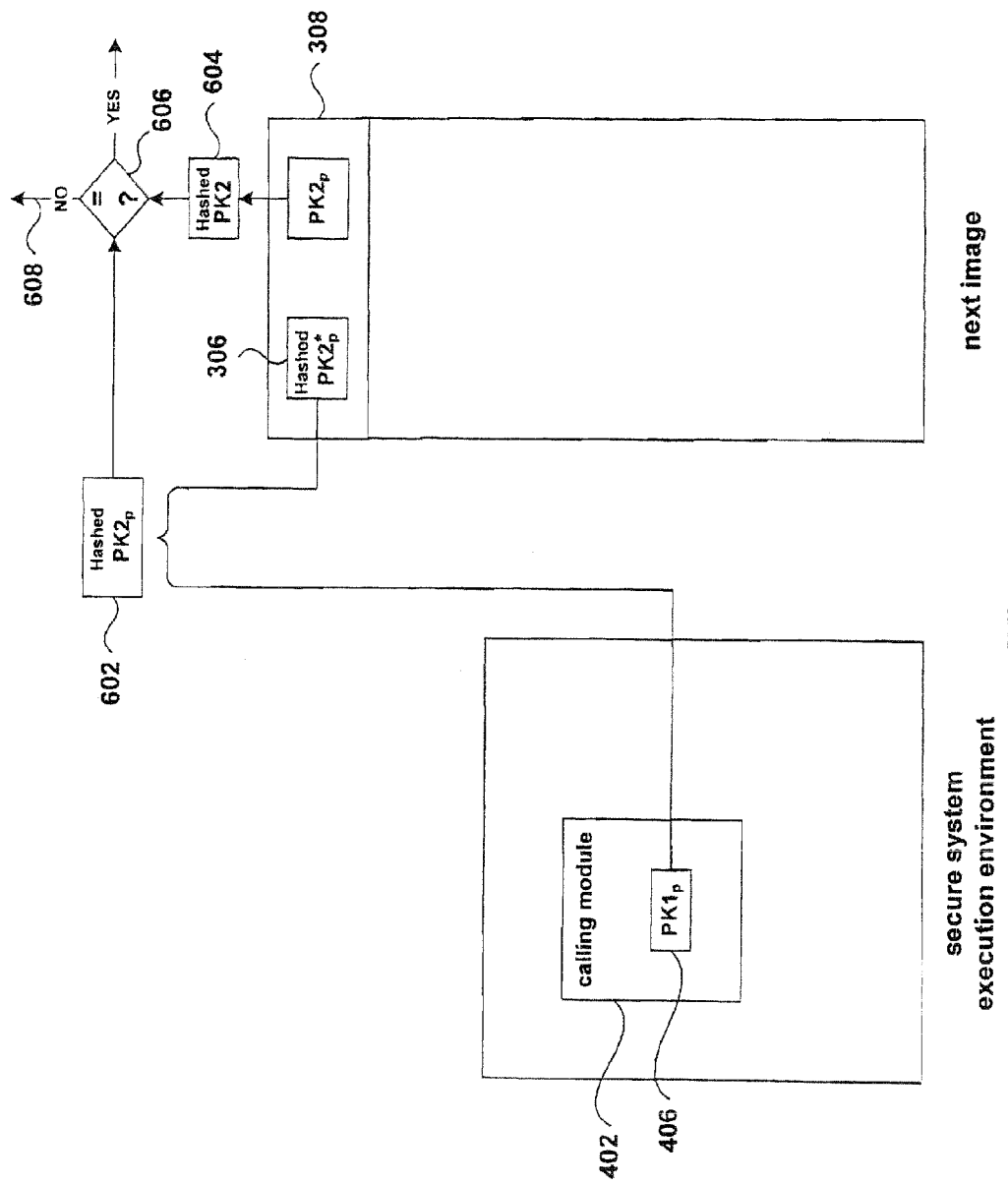

As shown in FIG. 6, the calling module 402 next accesses the authentication header, extracting from the authentication header the hashed, encrypted public encryption key "$PK2_P^*$" 306 associated with the next firmware module. The calling module 402 then employs its public key "$PK1_P$" 406 to decrypt the encrypted, hashed public key "$PK2_P^*$" to produce a hashed public key "$PK2_P$" 602. Then, the calling module 402 extracts the clear-text public encryption key "$PK2_P$" from the authentication header 308 and hashes the clear-text public encryption key "$PK2_P$" 604, and then compares 606 the extracted hashed $PK2_P$ with the decrypted, hashed $PK2_P$ 602 in order to determine whether or not the next firmware module is an authentic firmware module. If the decrypted, hashed $PK2_P$ 602 is identical to the extracted hashed $PK2_P$ 604, then the next firmware module is an authentic firmware module produced by the firmware module vendor after receiving the hashed, encrypted public encryption key "$PK2_P^*$" from the vendor of the calling module 402. After the next firmware module is authenticated, the verification portion of the authentication and verification process ensues, described below with respect to FIG. 7. Otherwise, as indicated by the negative arrow 608 in FIG. 6, the authentication portion of the authentication and verification process fails, and the calling module 402 may take appropriate action. The calling module 402 may, for example, display an authentication failure message to a console and terminate the bootstrap process.

Figure 7:
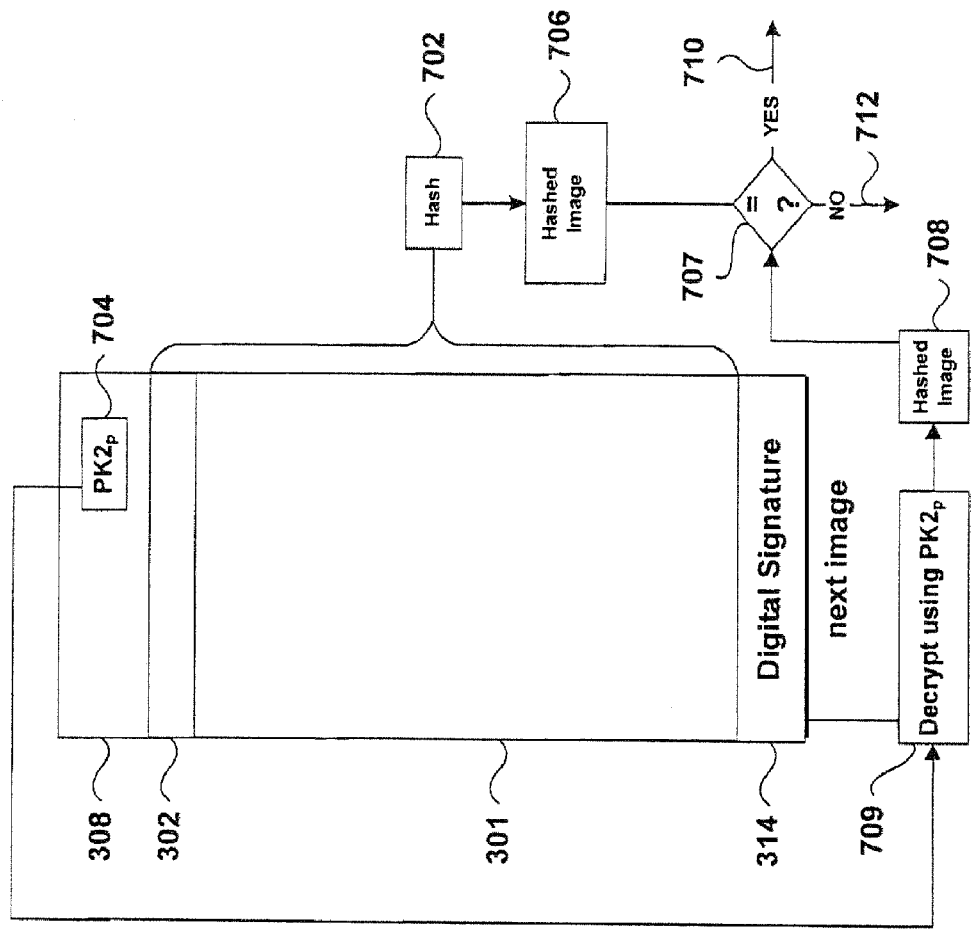
Figure 7:
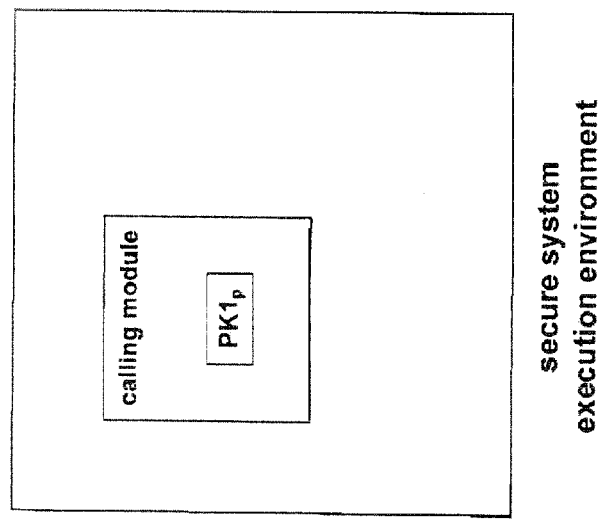

The verification portion of the authentication and verification process that represents one embodiment of the present invention is illustrated in FIG. 7. In the verification portion of the process, the calling module hashes the firmware-module image 301, including the ISLGUID block 302, and then compares 707 the hashed firmware-module image 706 with a hashed firmware-module image 708 obtained by extracting the digital signature stored in the verification footer 314 appended to the firmware module and decrypting 709 the digital signature with the module-specific public encryption key "$PK2_P$." If the extracted and decrypted digital signature is equal to the digital signature 706 produced in the hashing step 702, then the next firmware-module image has been both authenticated and verified, as indicated by the positive arrow 710 in FIG. 7. Otherwise as indicated by the negative arrow 712 in FIG. 7, the verification step has failed. Again, the calling module can take appropriate steps upon failure and success.

The authentication portion of the authentication and verification process thus authenticates a next firmware module as having been produced by the expected vendor. No other vendor or malicious firmware producer can include the hashed and encrypted public key "$PK2_P^*$" into the authentication header 308. The verification portion of the authentication and verification process ensures that the firmware-module image produced by the authenticated firmware vendor has not been altered or corrupted since being produced by the firmware-module vendor. By undertaking the authentication and verification process illustrated in FIGS. 4-7, the calling module can confidently access, execute, and/or incorporate the next firmware-module image within the secure-system execution environment without compromising the security of the secure system.

Although the present invention has been described in terms of a particular embodiment, it is not intended that the invention be limited to this embodiment. Modifications within the spirit of the invention will be apparent to those skilled in the art. For example, as discussed above, a next firmware-module image may include the ISLGUID block, authentication block, and verification block in various different locations within the authenticatable and verifiable firmware-module image. While the technique of one embodiment of the present invention has been described with respect to a secure-boot procedure that sequentially accesses, executes, and/or incorporates firmware modules into a secure system, the same technique can be applied to software modules and to other instruction-containing entities. Specific cryptographic methodologies are used in the disclosed embodiment, but many comparable and equally effective cryptographic methodologies may alternatively be employed. For example, various different secure hash algorithms are available, and it may be possible to employ another method to produce a small, easily encrypted portion of a next image.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method comprising:
   extracting, from an authenticable and verifiable module in a computer, a module-specific public key and cryptographically protected data related to the module-specific public key, wherein both the module-specific public key and the cryptographically protected data related to the module-specific public key are contained as separate elements in the authenticable and verifiable module;
   comparing, in the computer, the cryptographically protected data extracted from the authenticable and verifiable module with the module-specific public key extracted from the authenticable and verifiable module to authenticate the authenticable and verifiable module; and
   comparing, in the computer, a value calculated from an image, including a size and location block, included within the authenticable and verifiable module with a value extracted from a digital signature contained in a verification block within the authenticable and verifiable module to verify the authenticable and verifiable module, wherein the size and location block includes information describing a size and location of one or more portions of the image.

2. The method of claim 1, further comprising:
   performing a secure boot process in the computer, wherein the authenticable and verifiable module is a first boot process module executable in the secure boot process, the secure boot process comprising a second boot process module initiating loading of the first boot process module,
   wherein extracting the module-specific public key and cryptographically protected data, comparing the cryptographically protected data with the module-specific public key, and comparing the value calculated from the image with the value extracted from the digital signature are performed to authenticate and verify the first boot process module prior to executing the first boot process module.

3. The method of claim 2, further comprising:
   terminating the secure boot process in response to a failure in authenticating and verifying the first boot process module.

4. The method of claim 2, further comprising:
   loading the second boot process module from read-only memory in the computer; and
   loading the first boot process module from writable memory in the computer.

5. The method of claim 2, wherein the first boot process module is a first firmware module from a first vendor, and the second boot process module is a second firmware module from a second, different vendor.

6. The method of claim 1, wherein extracting, from the authenticable and verifiable module, the module-specific public key and cryptographically protected data related to the module-specific public key includes:
   extracting, from an authentication block at a known location within the authenticable and verifiable module, a clear-text version of the module-specific public key and an encrypted, hashed module-specific public key, where the module-specific public key includes the clear-text version of the public key and the cryptographically protected data includes the encrypted hashed module-specific public key.

7. The method of claim 6, wherein comparing the cryptographically protected data with the module-specific public key to authenticate the authenticable and verifiable module further includes:
   hashing the clear-text version of the module-specific public key to produce a newly hashed module-specific public key;
   decrypting the encrypted, hashed module-specific public key using a first private encryption key; and
   comparing the decrypted, hashed module-specific public key with the newly hashed module-specific public key.

8. The method of claim 7, wherein, when the decrypted, hashed module-specific public key is identical to the newly hashed module-specific public key, the authenticable and verifiable image is determined to be authenticated.

9. The method of claim 1, wherein comparing the value calculated from the image, including the size and location block, included within the authenticable and verifiable module with the value extracted from the digital signature contained in the verification block within the authenticable and verifiable module to verify the authenticable and verifiable module includes:
   hashing the image, including the size and location block, included within the authenticable and verifiable module to produce a newly hashed image;
   extracting the digital signature from the verification block within the authenticable and verifiable module, and decrypting the digital signature using the module-specific public key to produce an extracted hashed image;
   comparing the newly hashed image with the extracted hashed image.

10. The method of claim 9, wherein, when the extracted hashed image is identical to the newly hashed image, the authenticable and verifiable module is determined to be verified.

11. The method of claim 1, employed during secure access, execution, and/or incorporation of the authenticable and verifiable module into a secure-computer processing environment, wherein, when the authenticable and verifiable module is authenticated and verified by the method of claim 1, the authenticable and verifiable module is accessed, executed, and/or incorporated, and when the authenticable and verifiable module is not authenticated or not verified, the authenticable and verifiable module is not executed and/or incorporated.

12. The method of claim 11 employed in a secure booting of a secure computer system, wherein, when the authenticable and verifiable module is not executed and/or incorporated, the secure booting fails.

13. A non-transitory computer-readable medium containing computer instructions that when executed by the computer carry out the method of claim 1.

14. A non-transitory computer-readable medium containing computer instructions that when executed by the computer carry out the method of claim 2.

15. A computer comprising:
   at least one storage medium to store at least a first boot process module and a second boot process module; and
   a processor to perform a secure boot process that comprises:
      executing the first boot process module;
      as part of executing the first boot process module, initiating loading of the second boot process module;
      in response to initiating loading of the second boot process module, authenticating and verifying the second boot process module, wherein authenticating and verifying the second boot process module includes:

authenticating the second boot process module based on comparing a clear-text version of a public key provided in the second boot process module with a hashed, encrypted public key provided separately in the second boot process module; and verifying the second boot process module based on using a digital signature provided with the second boot process module.

16. The computer of claim 15, wherein the second boot process module is authenticated by:

comparing a hashed value based on hashing the clear text version of the public key provided in the second boot process module with a decrypted version of the hashed, encrypted public key provided in the second boot process module.

17. The computer of claim 16, wherein the hashed, encrypted public key is decrypted with the public key to produce the decrypted version of the hashed, encrypted public key.

18. The computer of claim 15, wherein the second boot process module is verified by:

hashing an executable code image of the second boot process module to produce a newly hashed image, the executable code image including a block containing information describing a size and location of one or more portions of the executable code image;

decrypting a digital signature provided in the second boot process module using the public key to form an extracted hashed image; and comparing the newly hashed image with the extracted hashed image.

19. The computer of claim 15, wherein the secure boot process is terminated in response to failure of either the authenticating or verifying.

20. The computer of claim 15, wherein the first boot process module is a first firmware module, and wherein the second boot process module is a second firmware module.

21. The method of claim 6, wherein comparing the cryptographically protected data with the module-specific public key comprises:

comparing a value calculated from the encrypted, hashed module-specific public key to a value calculated from the clear-text version of the module-specific public key.

* * * * *